United States Patent
Nee et al.

(10) Patent No.: US 10,371,515 B2
(45) Date of Patent: Aug. 6, 2019

(54) SYSTEM AND METHOD FOR DEMODULATING POSITION SENSE SIGNALS OUTPUT FROM POSITION SENSOR

(71) Applicant: BAE Systems Controls Inc., Endicott, NY (US)

(72) Inventors: Patrick Nee, Clarks Summit, PA (US); David R. Herdzik, Endicott, NY (US)

(73) Assignee: BAE Systems Oontrols Inc., Endicott, NY (US)

( * ) Notice: Subject to any disclaimer, the term of this patent is extended or adjusted under 35 U.S.C. 154(b) by 72 days.

(21) Appl. No.: 15/652,479

(22) Filed: Jul. 18, 2017

(65) Prior Publication Data
US 2019/0025052 A1   Jan. 24, 2019

(51) Int. Cl.
| | |
|---|---|
| G01B 21/00 | (2006.01) |
| G01B 21/22 | (2006.01) |
| G01D 5/00 | (2006.01) |
| G01D 5/20 | (2006.01) |
| G01D 5/22 | (2006.01) |

(52) U.S. Cl.
CPC .............. *G01B 21/22* (2013.01); *G01D 5/00* (2013.01); *G01D 5/206* (2013.01); *G01D 5/2291* (2013.01)

(58) Field of Classification Search
CPC ...................................................... G01B 21/22
USPC ............................................................ 702/151
See application file for complete search history.

(56) References Cited

U.S. PATENT DOCUMENTS 4,134,065 A * 1/1979 Bauer .................. G01D 5/2258
324/207.18

* cited by examiner

*Primary Examiner* — Hien D Khuu
(74) *Attorney, Agent, or Firm* — Scully Scott Murphy & Presser PC; Scott J. Asmus

(57) ABSTRACT

A system for detecting a position of an object includes a position sensor and a demodulator. The position sensor receives a first excitation signal, senses a displacement of the object with respect to a reference point based on the first excitation signal, and generates first and second sense signals based on the first excitation signal. The demodulator receives the first sense signal and the second sense signal from the position sensor, performs a first cross-correlation calculation between the first sense signal and a second excitation signal and a second cross-correlation calculation between the second sense signal and the second excitation signal, determines displacement of the object with respect to the reference point based on results of the first and second cross-correlation calculations, and determine a position of the object based on the displacement.

15 Claims, 12 Drawing Sheets

SYSTEM AND METHOD FOR DEMODULATING POSITION SENSE SIGNALS OUTPUT FROM POSITION SENSOR

FIELD

The present disclosure relates to a position sensing system, and more particularly to demodulating position sense signals output from a position sensor to provide position information for an object.

BACKGROUND

Many position sensors use an AC excitation signal as a primary signal and generate position sense signals as secondary signals. Information corresponding to a position of an object (e.g., control surfaces in an aircraft, a stator in a motor system, etc.) is included in each of the position sense signals. There have been several techniques to extract the position information from the position sense signals generated by the position sensors.

In some examples based on a phase locked loop (PLL), the PLL is employed for adjusting an output of a voltage-controller oscillator (VCO) until it locks in frequency and phase to an input signal. Thus, the PLL may be sensitive to phase delays of the input signal to cause circuit instability. Also, the PLL is noisy due to the VCO running asynchronously with other signals on a circuit board.

In other examples using one or more diodes for rectifying and filtering signals or a phase sensitive demodulator, a plurality of filters are used to provide an average over multiple cycles of an input signal. However, some of the filters may have long time constants to improve accuracy to thus result in unwanted delays in the overall system.

In other examples using a demodulator based on a zero-cross detection circuitry, a half-wave average filter circuitry, and a precision-rectifier averaging circuitry for synchronous demodulation, the zero cross detection circuitry toggles input switches therein in phase with an AC excitation signal to allow them selectively to be connected to averaging filters of the half-wave average filter circuitry. The average filters generate signals with a small amount of ripple voltage at a modulation frequency. The output signals generated from the average filters may then be sampled by an analogue-to-digital converter (ADC) and mathematical calculations may be performed on the sampled signals to output a position signal by a processor based on a field-programmable gate array (FPGA) or digital signal processor (DSP). However, this implementation requires a relatively large number of circuits and components, and some of the circuits and components can serve as potential error sources. The averaging filters present a tradeoff between a ripple amplitude (e.g., error), a dynamic response, and a circuit complexity.

Thus, there is a need of a demodulation technique with an improved accuracy, greater reliability, and lowered size/weight.

SUMMARY

In an aspect of the present disclosure, a system for detecting a position of an object is provided. The system includes a position sensor and a demodulator. The position sensor is configured to receive a first excitation signal, sense a displacement of the object with respect to a reference point based on the first excitation signal, and generate a first sense signal and a second sense signal based on the first excitation signal. Each of the first and second sense signals includes information associated with the displacement of the object with respect to the reference point. The demodulator includes one or more processors and a memory coupled to the one or more processors. The memory stores processor-executable program instructions. The one or more processors, when executable the program instructions, are configured to receive the first sense signal and the second sense signal from the position sensor, perform a first cross-correlation calculation between the first sense signal and a second excitation signal having substantially the same frequency as the first excitation signal and a second cross-correlation calculation between the second sense signal and the second excitation signal, determine the displacement of the object with respect to the reference point based on a result of the first cross-correlation calculation and a result of the second cross-correlation calculation, and determine a position of the object based on the displacement with respect to the reference point.

In another aspect of the present disclosure, a method for demodulating position sense signals of a position sensor is provided. The method includes receiving a first sense signal and a second sense signal from the position sensor and an excitation signal, performing a first cross-correlation calculation between the first sense signal and the excitation signal and a second cross-correlation calculation between the second sense signal and the excitation signal, determining a displacement of the object with respect to a reference point based on a result of the first cross-correlation calculation and a result of the second cross-correlation calculation, and determining a position of the object based on the displacement of the object with respect to the reference point.

In still another aspect, a computer program product stored in a non-transitory computer readable storage medium having computer readable program instructions is provided. The computer readable program instructions are executable by at least one processor to cause the at least one processor to perform a method for demodulating position sense signals of a position sensor. The method includes receiving a first sense signal and a second sense signal from the position sensor and an excitation signal, performing a first cross-correlation calculation between the first sense signal and the excitation signal and a second cross-correlation calculation between the second sense signal and the excitation signal, determining a displacement of the object with respect to a reference point based on a result of the first cross-correlation calculation and a result of the second cross-correlation calculation, and determining a position of the object based on the displacement of the object with respect to the reference point.

DETAILED DESCRIPTION OF THE EMBODIMENTS

The present disclosure relates to a position sensing system or method for detecting a position of an object. The position sensing system includes: a position sensor configured to sense a position of the object and output position sense signals bearing position information in respective amplitudes thereof; and a demodulator configured to extract a position signal based on the position sense signals. In the context of the present disclosure, the object includes, but is not limited to: flight surfaces in an aircraft, various actuators to control positions of the flight surfaces, stators in generic motor systems, etc. In one example, the position signal detected through the position sensing system may be fed back to a system controller of the aircraft to be used to generate appropriate commands for the controlling of the actuators. Thus, the avionic applications require very accurate position information of the flight surfaces to safely and robustly control of the aircraft.

Examples of the position sensors include, but are not limited to: a linearly variable differential transformer (LVDT), a rotary variable differential transformers (RVDT), a resolver, a Hall effect sensor, a capacitive sensor, a synchro, an Eddy-current sensor, or the like, generating position sense signals bearing position information that represents a linear or angular displacement of the object with respect to a reference point (e.g., zero or null position). The LVDT and RVDT may collectively be referred to as VDTs.

Figure 1:
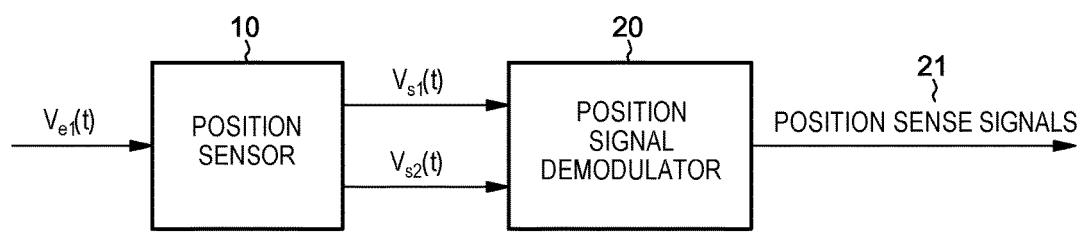
FIG. 1 is an example diagram of a position sensing system according to an embodiment of the present disclosure.

FIG. 1 is an example diagram of a position sensing system 1 according to an embodiment of the present disclosure.

Referring to the example depicted in FIG. 1, the position sensing system 1 includes a position sensor 10 and a position signal demodulator 20. The position sensor 10 is configured to sense a positional displacement (e.g., linear or angular displacement) of an object with respect to a reference point based on an AC excitation signal $V_{e1}(t)$ and output position sense signals $V_{s1}(t)$ and $V_{s2}(t)$ bearing position information within amplitudes thereof. The position signal demodulator 20 is configured to extract the position information from the position sense signals $V_{s1}(t)$ and $V_{s2}(t)$.

As depicted, the AC excitation signal $V_{e1}(t)$ is provided to the position sensor 10, and the position sensor 10 outputs one or more AC signals based on the excitation signal $V_{e1}(t)$.

In the embodiment of FIG. 1, two AC signals $V_{s1}(t)$ and $V_{s2}(t)$ are output based on the excitation signal $V_{e1}(t)$. In one example, the excitation signal $V_{e1}(t)$ is a sinusoidal signal with a peak amplitude of $V_{e1\_amp}$ as shown in Equation (1). In one embodiment, each of the position sense signals $V_{s1}(t)$ and $V_{s2}(t)$ has substantially the same frequency as the excitation signal $V_{e1}(t)$ and bears the position information of the object within amplitude variations thereof. The position signal demodulator 20 may demodulate the signals $V_{s1}(t)$ and $V_{s2}(t)$ to extract a position of the object.

$$V_{e1}(t) = V_{e1\_amp} \sin(\omega_e t) \qquad \text{Equation (1)}$$

Here, $\omega_e$ is an angular frequency of the excitation signal $V_{e1}(t)$.

Figure 2A:
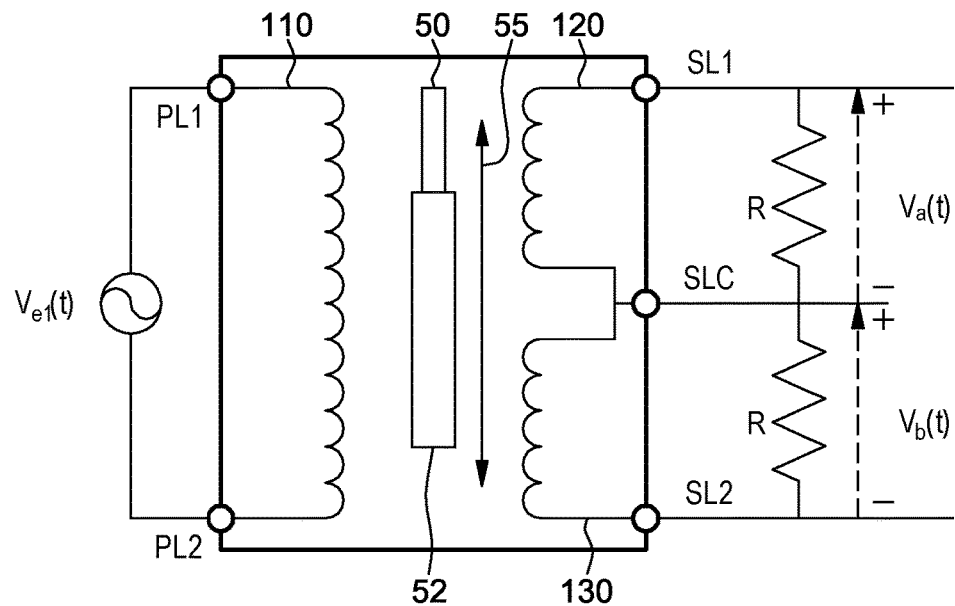
FIG. 2A is an example diagram of a position sensor according to an embodiment of the present disclosure.
Figure 2B:
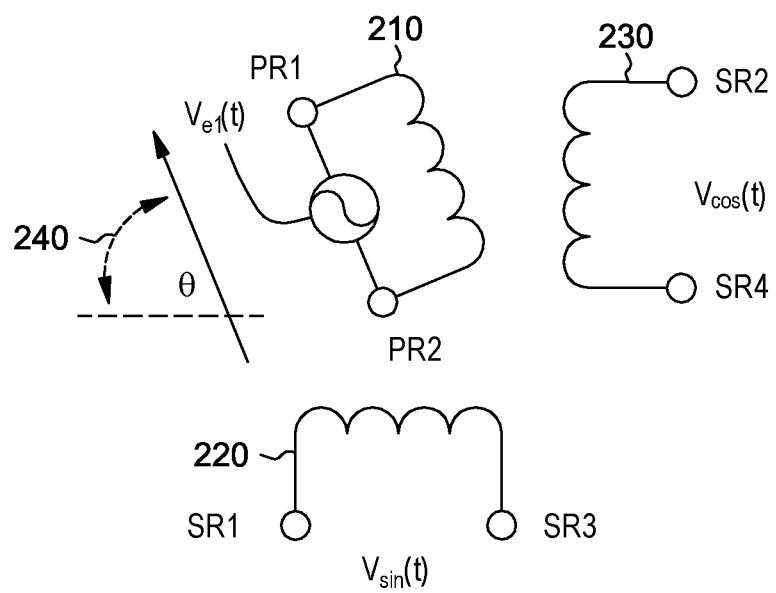
FIG. 2B is an example diagram of a position sensor according to an embodiment of the present disclosure.
Figure 3A:
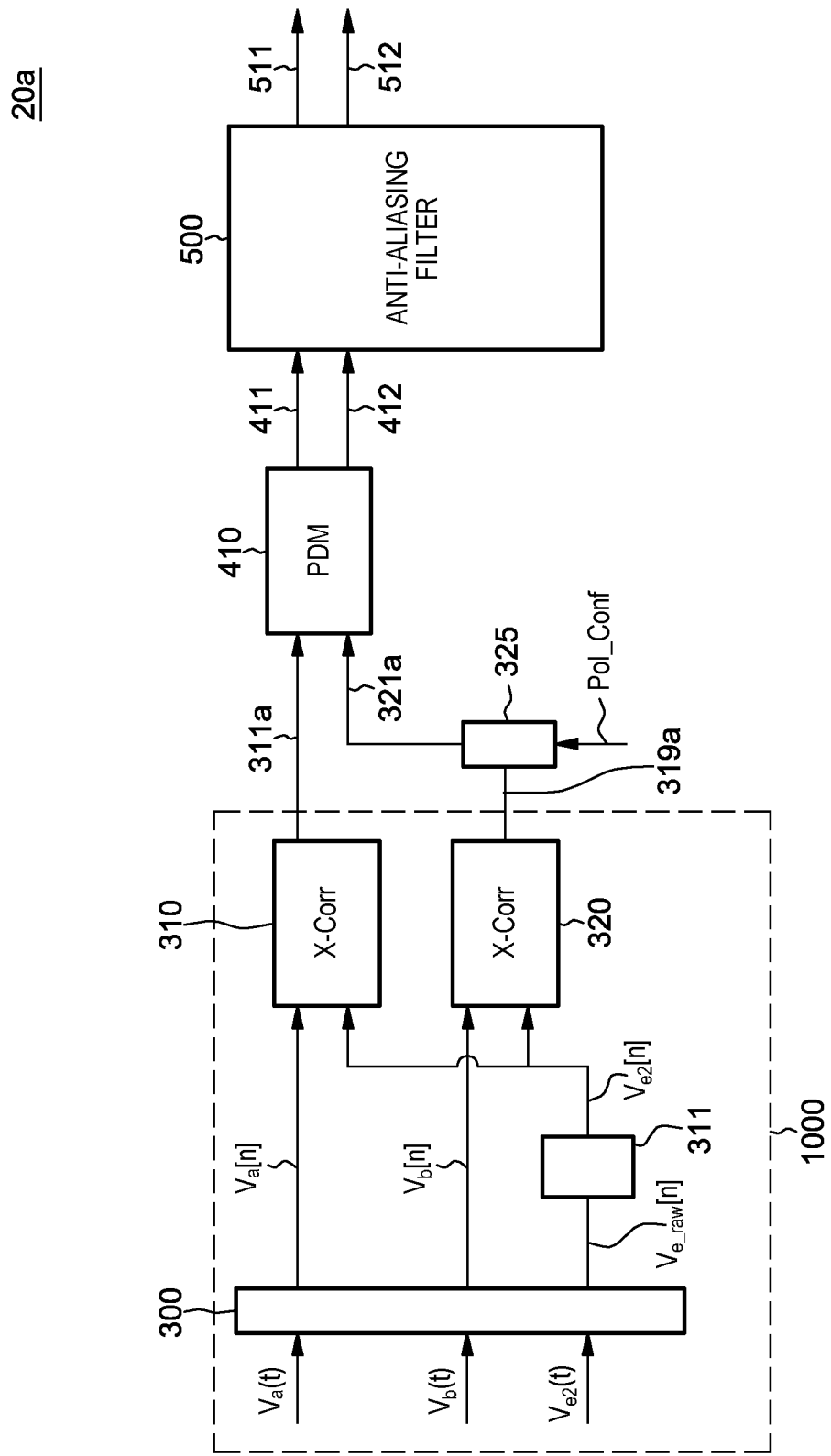
FIG. 3A is an example diagram of a position signal demodulator for demodulating position sense signals output from the position sensor of FIG. 2A according to an embodiment of the present disclosure.
Figure 3B:
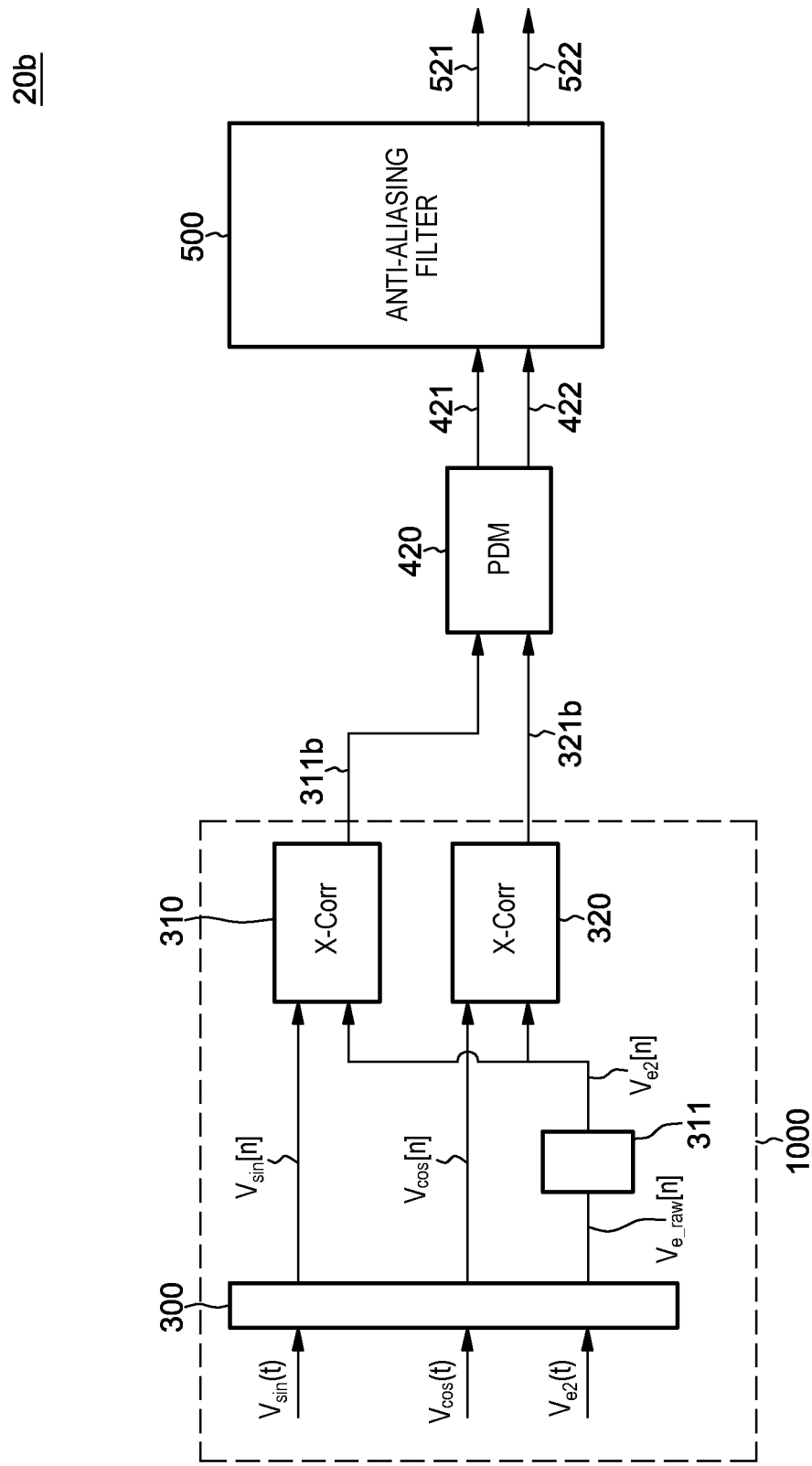
FIG. 3B is an example diagram of a position signal demodulator for demodulating position sense signals output from the position sensor of FIG. 2B according to an embodiment of the present disclosure.
Figure 3C:
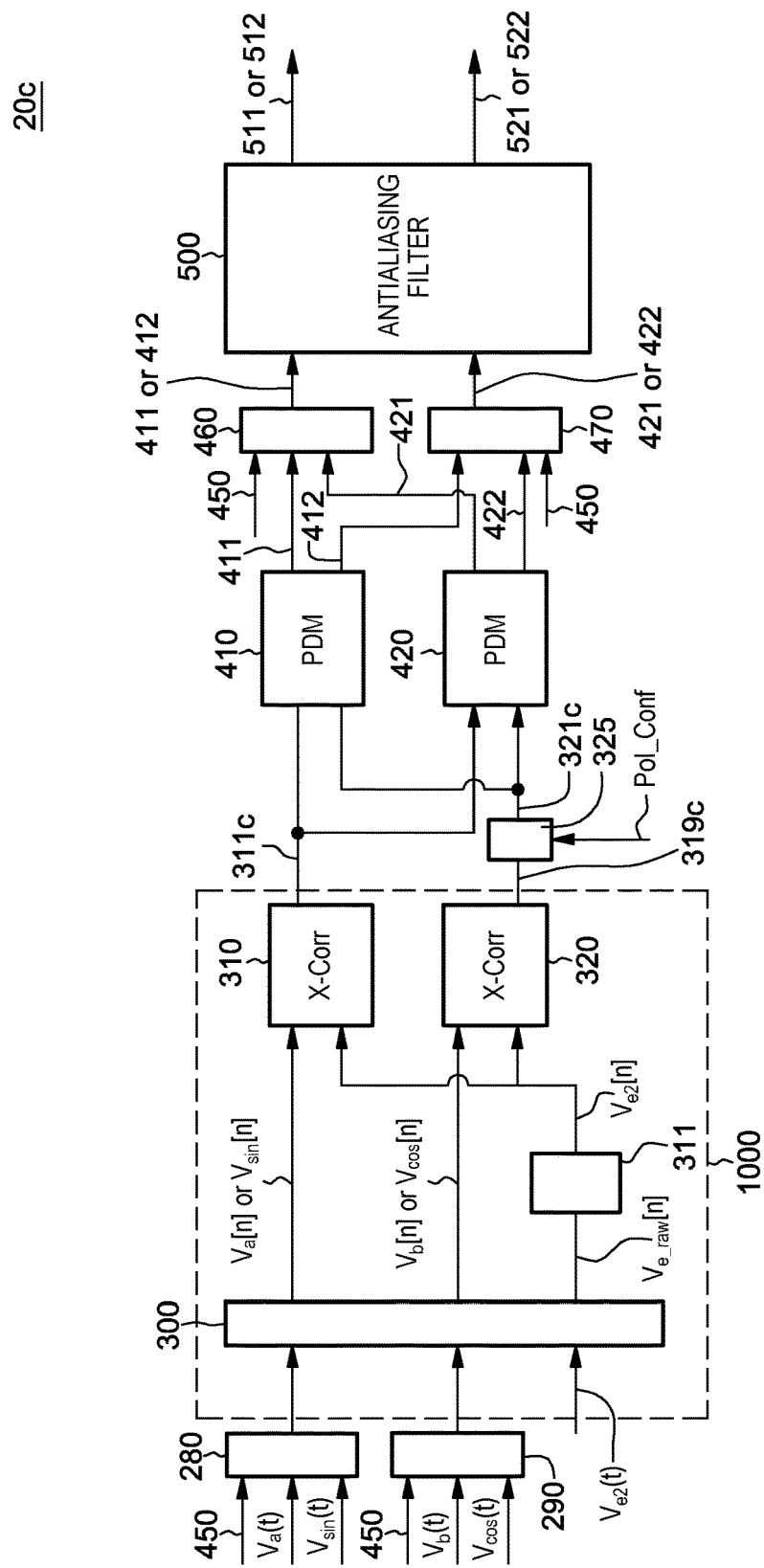
FIG. 3C is a block diagram of an example position signal demodulator for demodulating position sense signals output from multiple position sensors according to an embodiment of the present disclosure.

FIG. 2A is an example diagram of a linear position sensor 10a implemented using an LVDT. FIG. 2B is an example diagram of an angular position sensor 10b implemented using a resolver. FIG. 3A is an example diagram of a position signal demodulator 20a for demodulating position sense signals output from the linear position sensor 10a of FIG. 2A according to an embodiment of the present disclosure. FIG. 3B is an example diagram of a position signal demodulator 20b for demodulating position sense signals output from the angular position sensor 10b of FIG. 2B according to an embodiment of the present disclosure. FIG. 3C is a block diagram of an example position signal demodulator 20c for demodulating position sense signals output from multiple position sensors according to an embodiment of the present disclosure.

Referring back to the example depicted in FIG. 2A, the linear position sensor 10a (e.g., LVDT) includes three windings (e.g., solenoid coils): a primary winding 110 and a pair of secondary windings 120 and 130.

When the excitation signal $V_{e1}(t)$ is applied between nodes PL1 and PL2 and an object 50 being measured for position slides or moves upwardly or downwardly inside a tubular body 52 along with a linear axis 55, the AC excitation signal $V_{e1}(t)$ drives the primary winding 110 and causes voltages to be induced on the secondary windings 120 and 130.

The respective two position sense signals $V_a(t)$ and $V_b(t)$ provided through the secondary windings 120 and 130 are given by the following equations (2) and (3):

$$V_a(t) = \left(1 + \frac{P_L}{K_{vdt}}\right) \frac{V_{e1\_amp} G_{vdt}}{2} \sin(\omega_e t + \sigma) \qquad \text{Equation (2)}$$

$$V_b(t) = \left(1 - \frac{P_L}{K_{vdt}}\right) \frac{V_{e1\_amp} G_{vdt}}{2} \sin(\omega_e t + \rho) \qquad \text{Equation (3)}$$

Here, $P_L$ is a target linear displacement of the object 50 to be extracted, $K_{vdt}$ is a sensitivity of the linear position sensor 10a, $G_{vdt}$ is a transformer gain, $\sigma$ is a phase delay between the excitation signal $V_{e1}(t)$ and the position sense signal $V_a(t)$, and $\rho$ is a phase delay between the excitation signal $V_{e1}(t)$ and the position sense signal $V_b(t)$. For the sake of simplicity, it is assumed that the transformer gains of the secondary windings 120 and 130 are the same as each other.

In one example, when the object 50 is at a reference position (e.g., a central position; $P_L=0$), the position sense signal $V_a(t)$ between nodes SL1 and SLC of the secondary winding 120 is the same as the position sense signal $V_b(t)$ between nodes SL2 and SLC of the secondary winding 130, so that a differential output voltage (e.g., $V_a(t)-V_b(t)$) will be zero.

In another example, when the object 50 moves upwardly, the position sense signal $V_a(t)$ at the secondary winding 120 increases while the position sense signal $V_b(t)$ at the secondary winding 130 decreases. On the other hand, when the object 50 moves downwardly, the position sense signal $V_a(t)$ at the secondary winding 120 decreases while the position sense signal $V_b(t)$ at the secondary winding 130 increases.

Referring back to the example depicted in FIG. 2B, the angular position sensor 10b includes three windings (e.g., solenoid coils): a primary winding 210 and a pair of secondary windings 220 and 230.

When the excitation signal $V_{e1}(t)$ is applied between nodes PR1 and PR2 and an object such as a stator (not shown) rotate along an angular axis 240, the excitation signal $V_{e1}(t)$ drives the primary winding 210 and causes voltages to be induced on the secondary windings 220 and 230.

The respective two position sense signals $V_{sin}(t)$ and $V_{cos}(t)$ provided through the secondary windings 220 and 230 are given by the following equations (4) and (5):

$$V_{sin}(t) = G_{res} \times \sin\theta \times V_{e1\_amp} \sin(\omega_e t + \sigma) \qquad \text{Equation (4)}$$

$$V_{cos}(t) = G_{res} \times \cos\theta \times V_{e1\_amp} \sin(\omega_e t + \rho) \qquad \text{Equation (5)}$$

Here, $\theta$ is a target angular displacement of the object to be extracted and $G_{res}$ is a transformer gain.

Referring further to the example depicted in FIG. 3A, the position signal demodulator 20a for demodulating the position sense signals $V_a(t)$ and $V_b(t)$ output from the linear position sensor 10a includes an analog-to-digital conversion (ADC) module 300, cross-correlation modules 310 and 320, and a position determination module (PDM) 410.

The ADC module 300 is configured to convert an input analog signal to a digital signal. In FIG. 3A, the ADC module 300 converts the analog position sense signals $V_a(t)$ and $V_b(t)$ output from the linear position sensor 10a and an excitation signal $V_{e2}(t)$ to corresponding digital signals $V_a[n]$, $V_b[n]$, and $V_{e2}[n]$.

The cross-correlation module 310 performs a first cross-correlation calculation between the digital excitation signal $V_{e2}[n]$ and the digital position sense signal $V_a[n]$ to generate a first cross-correlation signal 311a. The cross-correlation module 320 performs a second cross-correlation calculation between the digital excitation signal $V_{e2}[n]$ and the digital position sense signal $V_b[n]$ to generate a second cross-correlation signal 319a.

The digital position sense signals $V_a[n]$ and $V_b[n]$ are given by the following equations (6) and (7), respectively:

$$V_a[n] = V_{a\_amp} \sin\left(\beta \frac{2\pi}{N} n + \sigma\right) + V_{a\_DC} \qquad \text{Equation (6)}$$

$$V_b[n] = V_{b\_amp} \sin\left(\beta \frac{2\pi}{N} n + \rho\right) + V_{b\_DC} \qquad \text{Equation (7)}$$

Here, N is the number of samples (e.g., N is an integer greater than 1) applied to the ADC module 300. Using the number of samples N which is a power of two, the processing of the monitoring amplitude can be more simplified because the cross-correlation results are scaled by a factor of N/2 and this scaling can be removed by dropping $\log_2(N/2)$ bits from the calculation result. For example, if N is selected to be 32, the cross-correlation results are scaled by 16, which can be corrected for by dropping 4 LSBs (i.e. dividing by 16).

In one embodiment, the digital excitation signal $V_{e2}[n]$ is further processed to remove a DC offset component generated during various analog circuit paths before the position signal demodulator 20a, using a DC removal block 311. Denoting the digital excitation signal before the DC removal block 311 as $V_{e\_raw}[n]$, the digital excitation signal $V_{e2}[n]$ wherein a DC offset has been removed from the signal $V_{e\_raw}[n]$, is given by the following equation (8):

$$V_{e2}[n] = V_{e\_raw}[n] - \sum_{n=0}^{N} V_{e\_raw}[n] = V_{e2\_amp} \sin\left(\beta \frac{2\pi}{N} n + \varphi\right) \qquad \text{Equation (8)}$$

Here, $\varphi$ is a phase of the digital excitation signal $V_{e2}[n]$, and $\beta$ is a value representing how accurately a frequency of each position sense signal $V_a(t)$ and $V_b(t)$ is matched with a frequency of the excitation signal $V_{e2}(t)$.

In one example, when the frequency of each position sense signal $V_a(t)$ and $V_b(t)$ is equal to the frequency of the excitation signal $V_{e2}(t)$, $\beta$ would be 1. In another example, even if $\beta$ is not 1 for the reasons that, e.g., the excitation signal $V_{e1}(t)$ input to the position sensor 10a or 10b of FIGS. 2A and 2B and the excitation signal $V_{e2}(t)$ input to the ADC module 300 (FIG. 3A) are generated independently from each other or generated using independent signal generators, the resulting error factor will be identical for both excitation signal inputs, and so there will be an identical impact on numerator and denominator terms in Equation 12 or Equation 20 which will be explained later. Therefore, there will be no impact on the recovered position using Equations 12 and 20. Therefore, $\beta$ is assumed to be 1 in the present disclosure for the sake of simplicity.

The first cross-correlation signal 311a (e.g., $V_{a\_scorr}[n]$) output from the cross-correlation module 310 is calculated using Equation (9) given by:

$$\begin{aligned}V_{a\_xcorr}[n] &= \sum_{n=0}^{N} V_{a\_amp} \sin\left(\frac{2\pi}{N} n + \sigma\right) \times V_{e2\_amp} \sin\left(\frac{2\pi}{N} n + \varphi\right) \\ &= \sum_{n=0}^{N} V_{a\_amp} V_{e2\_amp} \frac{1}{2} \left[\begin{array}{c} \cos(\sigma - \varphi) - \\ \cos\left(\frac{4\pi}{N} n + \sigma + \varphi\right) \end{array}\right] + \\ &\quad V_{a\_DC} \sin\left(\frac{2\pi}{N} n + \varphi\right) \\ &= \frac{N}{2} V_{a\_amp} V_{e2\_amp} \cos(\sigma - \varphi)\end{aligned} \qquad \text{Equation (9)}$$

In Equation (9) above, the sinusoidal signal terms $$\cos\left(\frac{4\pi}{N} n + \sigma + \varphi\right) \text{ and } V_{a\_DC} \sin\left(\frac{2\pi}{N} n + \varphi\right)$$

will be zero because accumulations are taken over one or multiple periods of the signals to result in removing the DC offset (e.g., $V_{a\_DC}$) present in the position sense signal $V_a[n]$. In many cases using conventional analog demodulations, such DC offset is not easily removed.

Similarly, the second cross-correlation signal 319a (e.g., $V_{b\_xcorr}[n]$) output from the cross-correlation module 320 may be calculated using Equation (10):

$$V_{b\_xcorr}[n] = \frac{N}{2} V_{b\_amp} V_{e2\_amp} \cos(\rho - \varphi) \qquad \text{Equation (10)}$$

In one embodiment, an optional polarity selection module 325 receives the second cross-correlation signal 319a and outputs a digital signal 321a, a polarity of which is selectively inverted or maintained (non-inverted) according to a polarity configuration signal Pol_Conf. When the polarity configuration signal is activated, the polarity of the second cross-correlation signal 319a may be inverted to be 180° out of phase with the first cross-correlation signal 311a, so that the numerator portion (e.g., $V_{a\_xcorr}[n] - V_{b\_xcorr}[n]$) of Equation (11) can be implemented. On the other hand, when the polarity configuration signal is deactivated, the polarity of the second cross-correlation signal 319a may not be inverted to be in phase with the first cross-correlation signal 311a, so that the denominator portion (e.g., $V_{a\_xcorr}[n] + V_{b\_xcorr}[n]$) of Equation (11) can be implemented.

Referring still to FIG. 3A, the first cross-correlation signal 311a and the output signal 321a of the polarity selection module 325 are input to the PDM 410. The PDM 410 generates a linear position signal 411 and an amplitude signal 412 based on the signals 311a and 321a. In one example, the PDM 410 is implemented using a ratiometric divider.

The linear position signal 411 is calculated by using Equation (11) given by:

$$P_L = \frac{V_{a\_xcorr}[n] - V_{b\_xcorr}[n]}{V_{a\_xcorr}[n] + V_{b\_xcorr}[n]} \qquad \text{Equation (11)}$$
$$= \frac{V_{a\_amp}\cos(\sigma - \varphi) - V_{b\_amp}\cos(\rho - \varphi)}{V_{a\_amp}\cos(\sigma - \varphi) + V_{b\_amp}\cos(\rho - \varphi)}$$
$$\approx \frac{V_{a\_amp} - V_{b\_amp}}{V_{a\_amp} + V_{b\_amp}}$$

In Equation (11), it is assumed that σ and ρ are substantially the same as each other.

Further, the amplitude signal 412 is calculated by using Equation (12) given by:

$$A_L = V_{a\_amp} + V_{b\_amp} \qquad \text{Equation (12)}$$

By way of example, referring back to FIG. 2A, Equation (11) may be understood that if the object 50 is at a reference point where the linear position sensor 10a generates the position sense signals $V_a(t)$ and $V_b(t)$ with same amplitudes (e.g., $V_{a\_amp}(t) = V_{b\_amp}(t)$), the position signal 411 will be zero, indicating that there is no linear displacement of the object 50 from the reference point and the object 50 is at the reference point. In another example, if the object 50 moves upwardly from the reference point by a certain distance along with the axis 55, the position signal 411 will not be zero, indicating that the object 50 is at a position spaced upwardly from the reference point along with the axis 55. Similarly, if the object 55 moves downwardly (opposed to the example above) from the reference point by a certain distance along with the axis 55, the position signal 411 will not be zero, indicating that the object 50 is at a position spaced downwardly from the reference point in the axis 55.

Next, the amplitude signal 412 (e.g., also referred to as a "monitoring signal") may indicate whether there is a fault or malfunction in the operations of the position sensor 10a and/or the position signal demodulator 20a. For example, if the position sensor 10a functions correctly, a sum of the position sense signals $V_a(t)$ and $V_b(t)$ will give a constant value regardless of a position of the object 50 along the axis 55. Thus, if the amplitude signal 412 is constant, it may be determined that the positioning sensing system 1 functions properly with no significant fault.

In addition, in one embodiment, the position signal demodulator 10a may further include an anti-aliasing filtering module 500 configured to filter and remove frequency components above the Nyquist rate of the receiving components. In one example, the anti-aliasing filtering module 500 is required when a sampling rate of the ADC module 300 is lower than twice the maximum frequency of the excitation signal $V_{e2}(t)$; otherwise, the anti-aliasing filtering module 500 is not required in the position signal demodulator 10a. In some aspects, as depicted in FIG. 3A, the filter 500 may be shared to perform the anti-aliasing filtering for the position signal 411 and the amplitude signal 412 in a time-division-multiplexing (TDM) manner to output signals 511 and 512.

Referring to the example depicted in FIG. 3B, the position signal demodulator 20b according to an embodiment for demodulating the position sense signals $V_{sin}(t)$ and $V_{cos}(t)$ output from the angular position sensor 10b includes the ADC module 300, the cross-correlation modules 310 and 320, and a PDM 420.

The ADC module 300 converts the analog position sense signals $V_{sin}(t)$ and $V_{cos}(t)$ output from the angular position sensor 10b and the excitation signal $V_{e2}(t)$ to corresponding digital signals $V_{sin}[n]$, $V_{cos}[n]$, and $V_{e2}[n]$.

The cross-correlation module 310 performs a first cross-correlation calculation between the digital excitation signal $V_{e2}[n]$ and the digital position sense signal $V_{sin}[n]$ to generate a first cross-correlation signal 311b. The cross-correlation module 320 performs a second cross-correlation calculation between the digital excitation signal $V_{e2}[n]$ and the digital position sense signal $V_{cos}[n]$ to generate a second cross-correlation signal 321b.

The digital position sense signals $V_{sin}[n]$ and $V_{cos}[n]$ are given by the following equations (13) and (14), respectively:

$$V_{sin}[n] = V_{sin\_amp} \sin\left(\frac{2\pi}{N}n + \sigma\right) + V_{sin\_DC} \qquad \text{Equation (13)}$$

$$V_{cos}[n] = V_{cos\_amp} \sin\left(\frac{2\pi}{N}n + \rho\right) + V_{cos\_DC} \qquad \text{Equation (14)}$$

As described above, in one embodiment, the digital excitation signal $V_{e2}(t)$ is further processed to remove a DC offset component generated during various analog circuit paths before the position signal demodulator 20b, through the DC removal block 311.

In FIG. 3B, the first cross-correlation signal 311b output from the cross-correlation module 310 is calculated using Equation (15):

Equation (15)

$$V_{sin\_xcorr}[n] = \sum_{n=0}^{N} V_{sin\_amp} \sin\left(\frac{2\pi}{N}n + \sigma\right) \times V_{e2\_amp} \sin\left(\frac{2\pi}{N}n + \varphi\right)$$
$$= \frac{N}{2} V_{sin\_amp} V_{e2\_amp} \cos(\sigma - \varphi)$$

Similarly, the second cross-correlation signal 321b output from the cross-correlation module 320 is calculated using Equation (16) given by:

$$V_{cos\_xcorr}[n] = \frac{N}{2} V_{cos\_amp} V_{e2\_amp} \cos(\rho - \varphi) \qquad \text{Equation (16)}$$

Referring still to FIG. 3B, the first and second cross-correlation signals 311b and 321b are input to the PDM 420. The PDM 420 generates an angular position signal 421 and an amplitude signal 422 based on the first and second cross-correlation signals 311b and 321b. In one example, the PDM 420 is implemented using a CORDIC software. The CORDIC software may require only additions, subtractions, and shift operations while simultaneously calculating an arctan and a distance formula for an amplitude calculation, allowing a more efficient digital implementation.

The angular position signal 421 is calculated by using Equations (17) and (18):

$$\theta = a\tan2(V_{sin\_xcorr}[n], V_{cos\_xcorr}[n]) \qquad \text{Equation (17)}$$
$$= a\tan2(V_{sin\_amp}\cos(\sigma - \varphi), V_{cos\_amp}\cos(\rho - \varphi))$$

If $\sigma$ is assumed to be the same as $\rho$ for the sake of simplicity, Equation 17 can be simplified as:

$$\theta = a\tan 2(V_{sin\_amp}, V_{cos\_amp}) \qquad \text{Equation (18)}$$

Here, a $\tan 2(V_{sin\_amp}, V_{cos\_amp})$ can be expressed by:

$$\theta = \begin{cases} \arctan\left(\frac{V_{sin\_amp}}{V_{cos\_amp}}\right) & \text{if } V_{cos\_amp} > 0, \\ \arctan\left(\frac{V_{sin\_amp}}{V_{cos\_amp}} + \pi\right) & \text{if } V_{cos\_amp} < 0 \text{ and } V_{sin\_amp} \geq 0, \\ \arctan\left(\frac{V_{sin\_amp}}{V_{cos\_amp}} - \pi\right) & \text{if } V_{cos\_amp} < 0 \text{ and } V_{sin\_amp} < 0, \\ +\frac{\pi}{2} & \text{if } V_{cos\_amp} = 0 \text{ and } V_{sin\_amp} > 0, \\ -\frac{\pi}{2} & \text{if } V_{cos\_amp} = 0 \text{ and } V_{sin\_amp} < 0, \\ \text{undefined} & \text{if } V_{cos\_amp} = 0 \text{ and } V_{sin\_amp} = 0 \end{cases} \qquad \text{Equation (19)}$$

Further, the amplitude signal 422 is calculated by using Equation (20):

$$A_R = \sqrt{V_{sin\_amp}^2 + K_{cos\_amp}^2} \qquad \text{Equation (20)}$$

By way of example, referring back to FIG. 2B, θ represents an angular displacement (with respect to a reference point) of an object attached to the primary winding 210, and θ is calculated to be a positive or negative value in which an absolute amplitude of θ indicates the angular displacement with respect to the reference point and a sign of θ indicates a direction of the angular displacement.

Next, the amplitude signal 422 may be used to monitor whether there is a fault or malfunction in the operations of the angular position sensor 10b and/or the position signal demodulator 20b. For example, the angular position sensor 10b functions correctly, a value $A_R$ will give a constant value regardless of a position of the object. Thus, if a control system (not shown) finds the amplitude signal 422 constant, it may determine that the positioning sensing system 1 functions properly with no significant fault.

In addition, in one embodiment, the position signal demodulator 20b further includes an anti-aliasing filtering module 500 configured to filter to remove frequency components above the Nyquist rate of the receiving components. In one example, the anti-aliasing filtering module 500 is required when a sampling rate of the ADC module 300 is lower than twice the maximum frequency of the excitation signal $V_{e2}(t)$; otherwise, the anti-aliasing filtering module 500 is not required in the position signal demodulator 20b. In some aspects, as depicted in FIG. 3B, the filter 500 may be shared to perform the anti-aliasing filtering for the position signal 421 and the amplitude signal 422 in a time-division-multiplexing (TDM) manner to output signals 521 and 522.

In one embodiment, a common position signal demodulator (e.g., 3C of FIG. 3A) can be used in a shared manner to demodulate various position signals such as the linear position signal, the angular position signal, etc.

FIG. 3C is a block diagram of an example position signal demodulator 20c for demodulating position sense signals output from multiple sense signals according to an embodiment of the present disclosure. The position signal demodulator 20c of FIG. 3C has a configuration which corresponds to a combination of the position signal demodulator 20a of FIG. 3A and the position signal demodulator 20b of FIG. 3B except that the position signal demodulator 20c further includes multiplexers 280 and 290 and signal selectors 460 and 470. Duplicate description thereof will be omitted for the sake of simplicity.

As shown in depicted in FIG. 3C, the multiplexers 280 and 290 may be disposed before the ADC module 300 and receive position sense signals provided by various types position sensors (e.g., 10a and 10b). For example, the position sense signals include the position sense signals $V_a(t)$ and $V_b(t)$ output from the linear position sensor 10a of FIG. 2A and the position sense signals $V_{sin}(t)$ and $V_{cos}(t)$ output from the angular position sensor 10b of FIG. 2B. Among the position sense signals $V_a(t)$, $V_b(t)$, $V_{sin}(t)$, and $V_{cos}(t)$, the signals $V_a(t)$ and $V_{sin}(t)$ are input to the multiplexer 280, and the signals $V_b(t)$ and $V_{cos}(t)$ are input to the multiplexer 290.

In one embodiment, a control system (not shown) generates and inputs a control signal 450 to each of the multiplexers 280 and 290, the position signal selector 460, and the monitoring signal selector 470.

The multiplexers 280 and 290 are configured to select a corresponding pair out of the linear position sense signals $V_a(t)$ and $V_b(t)$ and the angular position sense signals $V_{sin}(t)$ and $V_{cos}(t)$ to be output, in response to the control signal 450.

In one example, if the control signal 450 is at a logic low state (e.g., "0"), the multiplexers 280 and 290 are configured to select the position sense signals $V_a(t)$ and $V_b(t)$, respectively, as output signals. Similarly to what is described with reference to FIG. 3A, the cross-correlation module 310 calculates a cross-correlation between the position sense signal $V_a[n]$ and the excitation signal $V_{e2}[n]$, and the cross-correlation module 320 calculates a cross-correlation between the position sense signal $V_b[n]$ and the excitation signal $V_{e2}[n]$. Next, the output of each cross-correlation module 310 and 320 is provided to the PDMs 410 and 420. Thus, the PDM 410 generates and outputs the linear position signal 411 and the amplitude signal 412 to the position signal selector 460 and the monitoring signal selector 470, respectively. If the control signal 450 is at the logic low state (e.g., "0"), the position signal selector 460 and the monitoring signal selector 470 are configured to output the linear position signal 411 and the monitoring signal 412, respectively.

In addition, if the control signal 450 is at a logic high state (e.g., "1"), the multiplexers 280 and 290 are configured to select the position sense signals $V_{sin}(t)$ and $V_{cos}(t)$, respectively, as output signals. Similarly to what is described with reference to FIG. 3B, the cross-correlation module 310 calculates a cross-correlation between the position sense signal $V_{sin}[n]$ and the excitation signal $V_{e2}[n]$, and the cross-correlation module 320 calculates a cross-correlation between the position sense signal $V_{cos}[n]$ and the excitation signal $V_{e2}[n]$. Next, the output of each cross-correlation module 310 and 320 may be provided to the PDMs 410 and 420. Thus, the PDM 410 may generate and output the angular position signal 421 and the amplitude signal 422 to the position signal selector 460 and the monitoring signal selector 470, respectively. If the control signal 450 is at the logic high state (e.g., "1"), the position signal selector 460 and the monitoring signal selector 470 are configured to output the angular position signal 421 and the monitoring signal 422, respectively.

Figure 4:
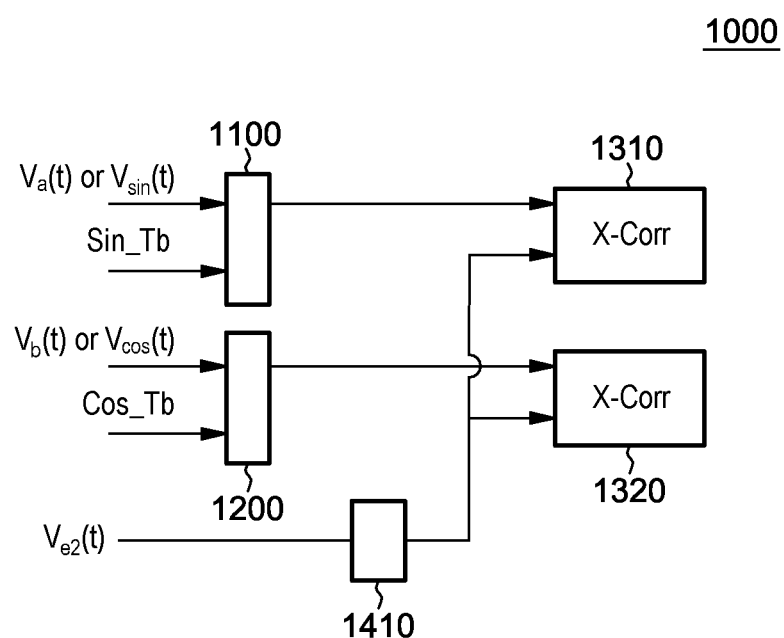
FIG. 4 depicts an example implementation of a functional block for an ADC module and cross-correlations modules of FIG. 3A, 3B, or 3C according to an embodiment of the present disclosure.

Referring back to FIGS. 3A to 3C, a portion 1000 of signal demodulators 20a to 20c, where the ADC module 300 and the cross-correlation modules 310 and 320 are included, performs an operation of "Discrete Fourier Transform" (DFT). In one embodiment, the DFT operation can be implemented using a sine table Sin_Tb and a cosine table Cos_Tb digitally sampled, as depicted in FIG. 4. The sine and cosine tables Sin_Tb and Cos_Tb may be stored in a memory (not shown) and a frequency of each of the sine and cosine tables Sin_Tb and Cos_Tb corresponds to a frequency of the excitation signal $V_{e2}(t)$. In one embodiment, a multiplexer 1100 selectively outputs one of the sine table Sin_Tb and a position sense signal (e.g., $V_a(t)$ or $V_{sin}(t)$) to a cross-correlation module 1310 according to a configuration bit (not shown), and a multiplexer 1200 selectively outputs one of the cosine table Cos_Tb and a position sense signal (e.g., $V_b(t)$ or $V_{cos}(t)$) to a cross-correlation module 1320 according to the configuration bit In addition, the excitation signal $V_{e2}(t)$ is provided to each of the cross-correlation modules 1310 and 1320 through a DC offset removal block 1410. Calculating cross-correlations between the excitation signal $V_{e2}(t)$ with the sine and cosine tables Sin_Tb and Cos_Tb may be equivalent to the DFT operation, and results in "Imaginary" and "Real" components of the excitation signal $V_{e2}(t)$ which can be run through a coordinate rotation digital computer (CORDIC) (also known as Volder's algorithm) software to determine an amplitude and a phase of the excitation signal $V_{e2}(t)$. The amplitude and the phase of the excitation signal $V_{e2}(t)$ can be used for an additional fault monitoring. For example, monitoring successive phases of the excitation signal $V_{e2}(t)$ allows to measure a relative frequency of the excitation signal $V_{e2}(t)$ with respect to the position sense signals $V_a(t)$ and $V_b(t)$ (or $V_{sin}(t)$ and $V_{cos}(t)$) at a certain sample rate to see if the excitation signal $V_{e2}(t)$ is generated from an independent source from the position signal demodulator.

Referring to FIGS. 3A to 3C, in one embodiment, a polarity selection module 325 receives the second cross-correlation signal 319c and outputs a digital signal 321c, a polarity of which is selectively inverted or maintained (non-inverted) according to a polarity configuration signal Pol_Conf. When the polarity configuration signal is activated, the polarity of the second cross-correlation signal 319c may be inverted to be 180° out of phase with the first cross-correlation signal 311c, so that the numerator portion (e.g., $V_{a\_xcorr}[n]-V_{b\_xcorr}[n]$) of Equation (11) can be implemented. On the other hand, when the polarity configuration signal is deactivated, the polarity of the second cross-correlation signal 319c may not be inverted to be in phase with the first cross-correlation signal 311c, so that the denominator portion (e.g., $V_{a\_xcorr}[n]+V_{b\_xcorr}[n]$) of Equation (11) can be implemented. This configuration may be implemented in a 5-wire VDT for additional fault detection. This also allows for a single hardware implementation to accommodate a 4-wire VDT and/or the 5-wire VDT, where the 4-wire VDT's secondary outputs are routed to the same hardware locations as the 5-wire outputs (e.g., $V_a(t)$ and $V_b(t)$).

In one embodiment, one or more of the ADC module 300, the cross-correlation modules 310 and 320, and the PDMs 410 and 420 are implemented using a hardware processor (not shown) or based on an FPGA design (not shown), but in other embodiments, they are implemented based on program code which is stored in a memory (not shown) or in the hardware processor, and executed by the hardware processor.

Figure 5:
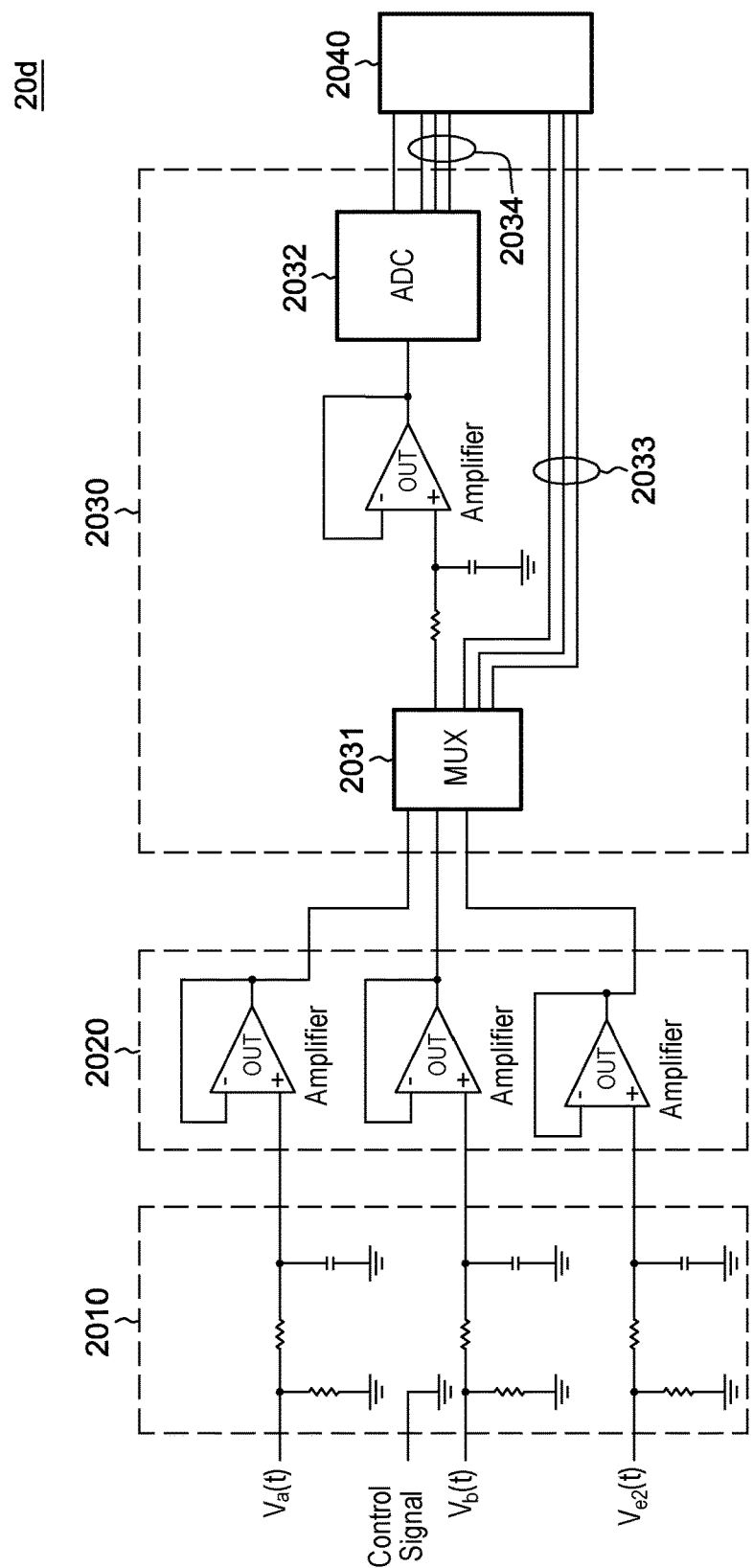
FIG. 5 is an example circuit diagram of a demodulator according to an embodiment of the present disclosure.

FIG. 5 is an example circuit diagram 20d of a position signal demodulator according to an embodiment of the present disclosure.

Referring to the example depicted in FIG. 5, the circuit diagram 20d includes an input filter circuitry 2010, an input buffer amplifier circuitry 2020, a multiplexer and ADC circuitry 2030, and a processing module 2040. The input filter circuitry 2010 receives position sense signals from a position sensor (e.g., 10a or 10b) and an excitation signal (e.g., $V_{e2}(t)$). The input buffer amplifier circuitry 2020 amplifies the position sense signals and the excitation signal. For example, the multiplexer and ADC circuitry 2030 includes: a multiplexer 2031 (e.g., 3:1 multiplexer) that multiplexes the position sense signals and the excitation signal output from the input buffer amplifier circuitry 20 and a ADC module 2032 that converts the multiplexed signals to corresponding digital signals and outputs the converted signals to the processing module 2040. The operations of the multiplexer 2031 and the ADC 2032 may be controlled by the processing module 2040 based on control lines 2033 and 2034. In one example, the processing module 2040 is implemented using a FPGA or DSP. Compared to a conventional position signal demodulator configuration using various analog components causing errors, the circuit diagram 20d of FIG. 5 requires a relatively small number of circuit components.

Figure 6A:
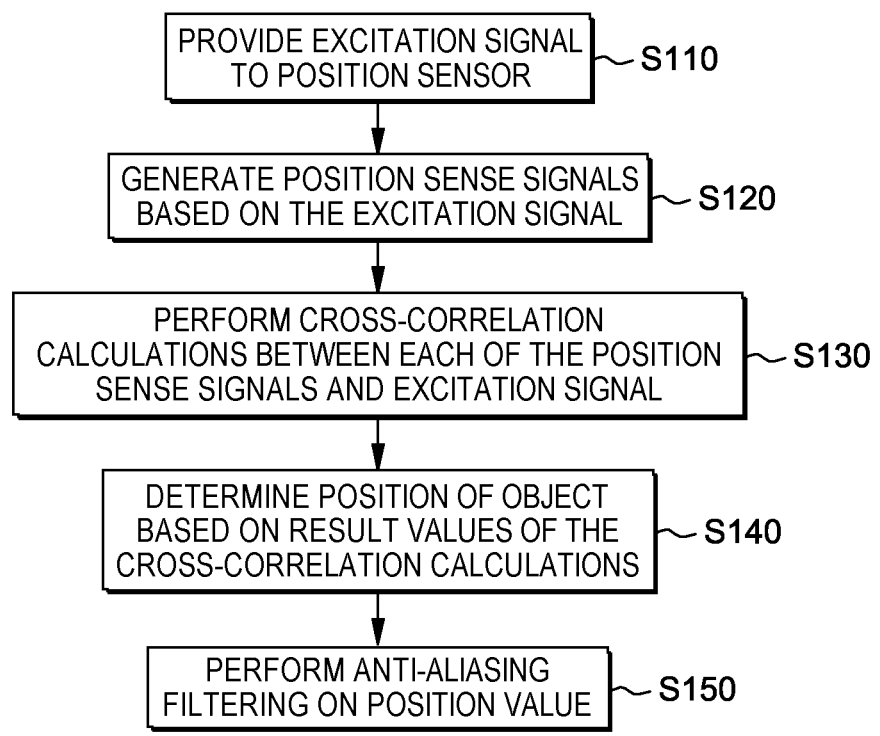
FIG. 6A is an example flow chart depicting a method for detecting a position of an object according to an embodiment of the present disclosure.

FIG. 6A is an example flow chart depicting a method 500 for detecting a position of an object according to an embodiment of the present disclosure.

Referring to the example depicted in FIGS. 2A, 2B, and 3A to 3C, the method includes steps S110 to S150.

At S110, a first excitation signal (e.g., $V_{e1}(t)$ of FIG. 2A or 2B) is provided to a position sensor (e.g., 10a of FIG. 2A or 10b of FIG. 2B). The position sensor generates position sense signals (e.g., $V_a(t)$ and $V_b(t)$ of FIG. 2A, or $V_{sin}(t)$ and $V_{cos}(t)$ of FIG. 2B) based on the first excitation signal (S120).

Next, the position signal demodulator (e.g., 20a of FIG. 3A, 20b of FIG. 3B, or 20c of FIG. 3C) receives the position sense signals and perform a first cross-correlation calculation between one of the position sense signals and a second excitation signal (e.g., $V_{e2}(t)$) and a second cross-correlation calculation between another one of the position sense signals and the second excitation signal (S130). In one example, the first and second excitation signals are generated from a common signal generator, thus have substantially the same frequency as each other; in another example, they are generated from different signal generators, but have substantially the same frequency.

At S140, the position signal demodulator determines a position of an object based on result values of the first and second cross-correlation calculations. For example, the position signal demodulator determines a linear displacement or an angular displacement of the object with respect to a reference point based on result values of the first and second cross-correlation calculations and determines the position of the object based on the linear or angular displacement with respect to the reference point.

In embodiment, an in optional step S150, the position signal demodulator may further perform anti-aliasing filtering on a result value (e.g., the position of the object) for determining the linear or angular displacement of the object with respect to the reference point.

Figure 6B:
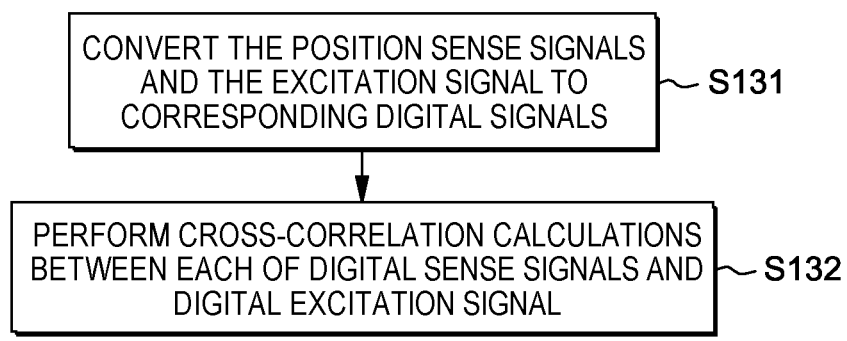
FIG. 6B is an example flow chart depicting details of the step S130 of FIG. 6A according to an embodiment of the present disclosure.

FIG. 6B is an example flow chart depicting details of the step S130 of FIG. 6A according to an embodiment of the present disclosure.

Referring to the example depicted in FIGS. 6A and 6B, the step S140 may include steps S131 to S132.

At S131, the position signal demodulator converts the position sense signals to a first digital sense signal (e.g., $V_a[n]$ or $V_{sin}[n]$ of FIG. 3C), a second digital sense signal (e.g., $V_b[n]$ or $V_{cos}[n]$ of FIG. 3C), and converts the second excitation signal to a second digital excitation signal (e.g., $V_{e2}[n]$ of FIG. 3C).

Next, at S132, the position signal demodulator performs the first and second cross-correlation calculations between the second digital sense signal and each of the first and second digital sense signals.

Figure 7A:
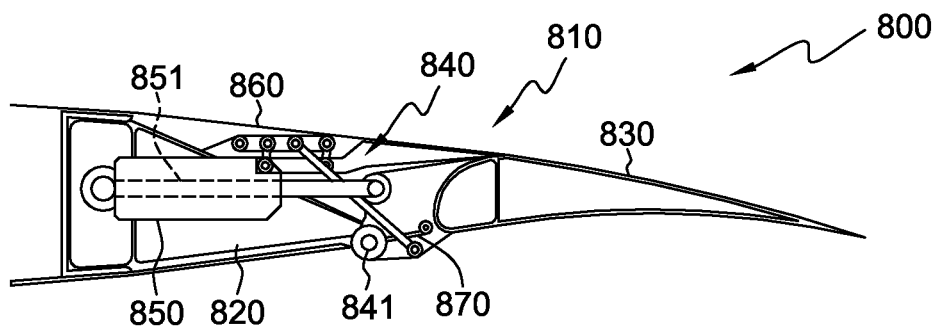
FIGS. 7A to 7C depict example usages of a position sensing system in relation to avionics flaps moving up and down according to an embodiment of the present disclosure.
Figure 7B:
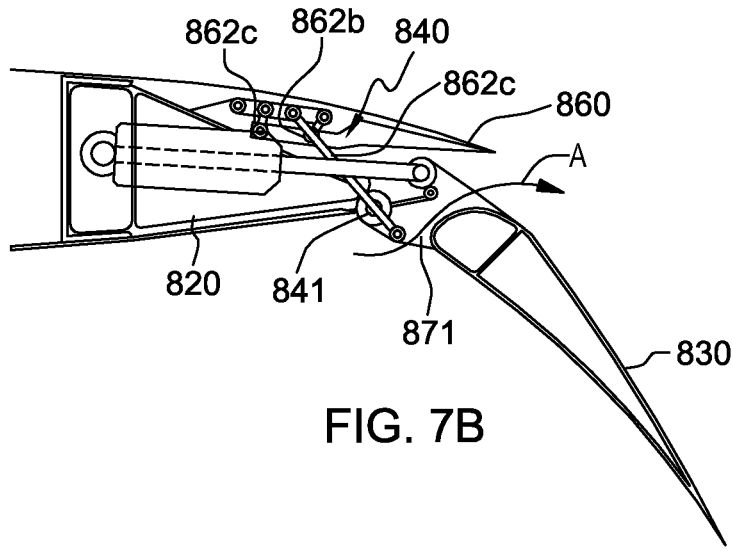
Figure 7C:
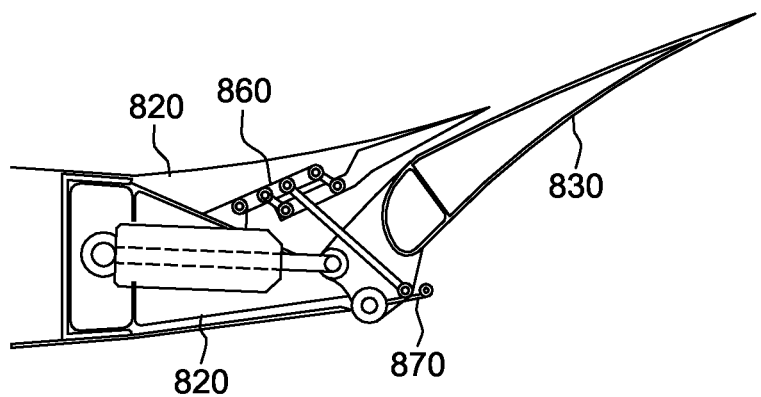

FIGS. 7A to 7C depict example usages of a position sensing system in relation to avionics flaps moving up and down according to an embodiment of the present disclosure.

Referring to the example depicted in FIGS. 7A to 7C are schematic illustrations of an aircraft system 800 having an airfoil 810. The airfoil 810 includes a first portion 820 and a second portion 830 movable relative to the first portion 820. Accordingly, the airfoil 810 can include an actuator 850 having an actuator arm 851 that moves the second portion 830 relative to the first portion 820. A guide structure 840 can control a motion of the second portion 830 relative to the first portion 820. In one aspect of this embodiment, the second portion 830 can pivot relative to the first portion 820 about a lower hinge line 841. The airfoil 810 can further include a fixed lower panel 870 and a flexible upper panel 860. As described below with reference to FIGS. 7B and 7C, the actuator arm 851 moves to the right when the second portion 830 moves downwardly and moves to the left when the second portion 830 moves upwardly. A position sensing system (not shown in FIGS. 7A to 7C) senses displacements in position of the actuator arm 851 (e.g., 50 of FIG. 2A) and feedbacks the sensed displacements to a control system of the aircraft. In one aspect, the guide structure 840 includes upper panel links 862a, 862b, and 862 that pivot to reversibly bend the flexible upper panel 860 downwardly in a convex manner as the second portion 830 moves relative to the first portion 820.

Using VDTs or resolvers for the aircraft control is preferred as it allows non-contact position sensing, so that the lifetime of the position sensors can be significantly increased.

In some aspects, the position signal demodulator (e.g., 20a, 20b, or 20c) according to an embodiment enables a synchronous demodulation for the position sense signals output from position sensors such as an LVDT, a resolver, etc. For example, the position signal demodulator detects only a portion of the amplitude of the position sense signal that is in phase with the excitation signal (e.g., $V_{e2}(t)$) while rejecting other portions that are out of phase with the excitation signal. This allows improvement of an accuracy of the position detection by removing undesirable temperature effects (e.g., unrelated to position) that are only present in the portion of the output which is out of phase with the excitation signal.

In other aspects, the position signal demodulator according to an embodiment provides an asynchronous demodulation where the entire amplitude of the position sense signal is used to determine a position (e.g., phase is not rejected).

In contrast to conventional demodulation methods, the present position signal demodulator functions with a high degree of independence from a system exciting the position sensor (e.g., 10a or 10b). Thus, in one example, the position sensor does not need to be phase locked to the position signal demodulator. Thus, an absolute phase of the position sense signal may not affect demodulation accuracy as only the phase of the position sense signal relative to the phase of the excitation signal is used for the calculation. In another example, the position sensor does not need to be frequency locked to the position signal demodulator. Thus, a mismatch between a frequency of the excitation signal (e.g., $V_{e1}(t)$) used at the position sensor and a sample frequency (or sample rate) of the position signal demodulator may not affect the demodulation accuracy.

Due to the independent feature in phase and/or frequency between the position sensor and the position signal demodulator allows to achieve high reliability environments where multiple independent position signal demodulators can demodulate the position sense signals output from a common position sensor (e.g., without being synchronized or running at exactly the same frequency with that of the common position sensor) and compare result values of the demodulations one to another.

In some aspects, the position signal demodulator according to an embodiment can be implemented with a relatively slow sampling speed (e.g., N=32) compared to other conventional position signal demodulators, thus allowing a high degree of circuit integration on a position sensing system. For example, a slow-speed ADC module can be used to simultaneously read the position sense signals provided from multiple position sensors. In one embodiment, the position signal demodulator (e.g., 20a, 20b, or 20c) can be implemented using a DSP or FPGA technique. The DSP or FPGA-based demodulations have following advantages over traditional analog demodulation.

In one example, the DSP or FPGA-based demodulations allow to achieve a higher accuracy than the conventional analog demodulation as they do not require analog circuit components generating various errors such as scaling errors or ripples in averaging filters, offsets in amplifiers and ADC, and offsets due to analog switch charge injections.

In another example, the DSP or FPGA-based demodulations allow to maximize a dynamic response of the recovered position. Unlike conventional demodulation methods, the present position signal demodulator allows to recover a position at a rate corresponding to, e.g., a sample rate of the ADC 300 or a product of a frequency of the excitation signal (e.g., $V_{e1}(t)$ or $V_{e2}(t)$) and the number of sample N used at the ADC module 300. For example, in the conventional demodulation methods, a position recovery (or detection) rate is limited by averaging filters down to e.g., 50 Hz or lower. By way of example, if it is assumed that a frequency of the excitation signal (e.g., $V_{e1}(t)$ or $V_{e2}(t)$) is 2 kHz and the number of sample N at the ADC 300 is 32, the position signal demodulator can recover a position at a 64 kHz rate. This rate (e.g., 64 kHz) can then be filtered and processed without significantly losing accuracy due to increased ripples generated by an averaging filter, so that a demodulation speed can get faster.

In still other example, the DSP or FPGA-based demodulations allow to reuse or share common elements (e.g., a demodulation core) such as computational resources (e.g., an arithmetic-logic unit (ALU)-based TDM module) to demodulate the position sense signals output from various position sensors such as a LVDT/RVDT, resolver, a proximity sensor, etc.

Figure 8:
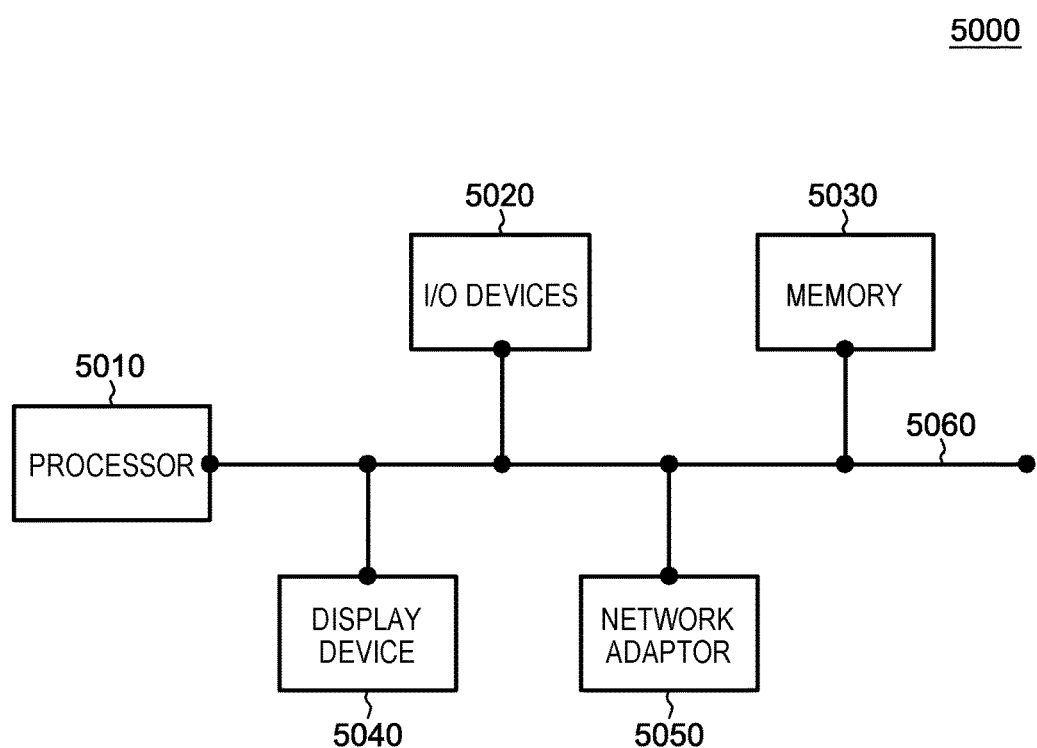
FIG. 8 is a block diagram of a computing system according to an embodiment of the present disclosure.

FIG. 8 is a block diagram of a computing system 5000 according to an embodiment of the present disclosure.

Referring to FIG. 8, the computing system 5000 is used as a platform for performing (or controlling) the operations or functions described hereinabove with respect to the position signal demodulator of FIGS. 3A to 3C and/or the method of FIGS. 6A and 6B.

As shown in FIG. 8, the computing system 5000 includes a processor 5010, I/O devices 5020, a memory system 5030, a display device 5040, and a network adaptor 5050.

The processor 5010 in this example drives the I/O devices 5020, the memory system 5030, the display device 5040, and the network adaptor 5050 through a bus 5060.

The computing system 5000 includes a program module (not shown) for performing (or controlling) the operations or functions described hereinabove with respect to the position signal demodulator of FIGS. 3A to 3C and/or the method of FIGS. 6A and 6B according to exemplary embodiments. For example, the program module may include routines, programs, objects, components, logic, data structures, or the like, for performing particular tasks or implement particular abstract data types. The processor (e.g., 5010) of the computing system 5000 may execute instructions written in the program module to perform (or control) the operations or functions described hereinabove with respect to the position signal demodulator of FIGS. 3A to 3C and/or the method of FIGS. 6A and 6B. The program module may be programmed into the integrated circuits of the processor (e.g., 5010). In an exemplary embodiment, the program module may be stored in the memory system (e.g., 5030) or in a remote computer system storage media.

The computing system 5000 may include a variety of computing system readable media. Such media may be any available media that is accessible by the computer system (e.g., 5000), and it may include both volatile and non-volatile media, removable and non-removable media.

The memory system (e.g., 5030) can include computer system readable media in the form of volatile memory, such as random access memory (RAM) and/or cache memory or others. The computer system (e.g., 5000) may further include other removable/non-removable, volatile/non-volatile computer system storage media.

The computer system (e.g., 5000) can communicate with one or more devices using the network adapter (e.g., 5050). The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A system for detecting a position of an object, comprising:
 a position sensor configured to receive a first excitation signal, sense a displacement of the object with respect to a reference point based on the first excitation signal, and generate a first sense signal and a second sense signal based on the first excitation signal, each of the first and second sense signals including information associated with the displacement of the object with respect to the reference point; and
 a demodulator comprising one or more modules,
 wherein the demodulator is implemented using one or more processors and a memory coupled to the one or more processors, the memory storing processor-executable program instructions,
 wherein the one or more modules are configured to:
 receive the first sense signal and the second sense signal from the position sensor;
 perform a first cross-correlation calculation between the first sense signal and a second excitation signal having substantially a same frequency as the first excitation signal, and a second cross-correlation calculation between the second sense signal and the second excitation signal;
 determine the displacement of the object with respect to the reference point based on a first result of the first cross-correlation calculation and a second result of the second cross-correlation calculation;
 determine the position of the object based on the displacement with respect to the reference point;
 wherein the respective amplitudes of the first sense signal and the second sense signal are functions of the displacement of the object with respect to the reference point;
 wherein the position sensor includes:
 a linear position sensor configured to sense a linear displacement of the object as the displacement; and
 an angular position sensor configured to sense an angular displacement of the object as the displacement.

2. The system of claim 1,
 wherein the first sense signal, the second sense signal, and the first excitation signal have substantially a same frequency one as another.

3. The system of claim 1, wherein to determine the linear displacement of the object, the one or more processors are further configured to:

calculate a following first equation:

$$\frac{V_{a\_xcorr} - V_{b\_xcorr}}{V_{a\_xcorr} + V_{b\_xcorr}},$$

wherein $V_{a\_xcorr}$ and $V_{b\_xcorr}$ respectively correspond to the result of the first and second cross-correlation calculations.

4. The system of claim 3, wherein to determine the linear displacement of the object, the one or more modules are further configured to:
 determine a calculation result of the first equation as the linear displacement of the object with respect to the reference point.

5. The system of claim 1, wherein to determine the angular displacement of the object, the one or more modules are further configured to:
 calculating a following second equation:

$$a\tan 2(V_{sin\_xcorr}, V_{cos\_xcorr}),$$

wherein $V_{sin\_xcorr}$ and $V_{cos\_xcorr}$ respectively correspond to the results of the first and second cross-correlation calculations.

6. The system of claim 5, wherein to determine the angular displacement of the object, the one or more modules are further configured to: determine a calculation result of the second equation as the angular displacement of the object with respect to the reference point.

7. The system of claim 1, further comprising an anti-aliasing filtering module configured to:
 perform an anti-aliasing filtering on the determined displacement of the object.

8. A method for demodulating position sense signals of a position sensor, comprising:
 at least one processor having memory with instructions that cause the at least one processor to perform:
  receiving a first sense signal and a second sense signal from the position sensor and an excitation signal;
  performing a first cross-correlation calculation between the first sense signal and the excitation signal and a second cross-correlation calculation between the second sense signal and the excitation signal;
  determining a displacement of an object with respect to a reference point based on a first result of the first cross-correlation calculation and a second result of the second cross-correlation calculation;
  determining a position of the object based on the displacement of the object with respect to the reference point;
  calculating a sum of the first result and the second result of the first cross-correlation calculation and the second cross-correlation calculation as a monitoring signal;
  determining that the demodulating of the first and second position sense signals functions properly, in response to the monitoring signal being a constant value; and
  providing the displacement and the position of the object to a control system, wherein the control system generates commands for the object.

9. The method of claim 8, wherein the first sense signal, the second sense signal, and the excitation signal have substantially a same frequency one as another.

10. The method of claim 8, wherein respective amplitudes of the first sense signal and the second sense signal are functions of the displacement of the object with respect to the reference point.

11. The method of claim 8, wherein the determining of the displacement of the object comprises:
 calculating a following first equation:

$$\frac{V_{a\_xcorr} - V_{b\_xcorr}}{V_{a\_xcorr} + V_{b\_xcorr}},$$

wherein $V_{a\_xcorr}$ and $V_{b\_xcorr}$ respectively correspond to the first and second results of the first and second cross-correlation calculations;
 determining a calculation result of the first equation as the displacement of the object with respect to the reference point.

12. The method of claim 8, wherein the determining of the displacement of the object comprises:
 calculating a following second equation:

$$a\tan 2(V_{sin\_xcorr}, V_{cos\_xcorr}),$$

wherein $V_{sin\_xcorr}$ and $V_{cos\_xcorr}$ respectively correspond to the first and second results of the first and second cross-correlation calculations;
 determining a calculation result of the second equation as the displacement of the object with respect to the reference point.

13. A computer program product stored in a non-transitory computer-readable storage medium having computer readable program instructions, the computer readable program instructions executable by at least one processor to cause the at least one processor to perform a method for demodulating position sense signals of a position sensor, wherein the method comprises:
 receiving a first sense signal and a second sense signal from the position sensor and an excitation signal;
 performing a first cross-correlation calculation between the first sense signal and the excitation signal and a second cross-correlation calculation between the second sense signal and the excitation signal;
 determining a displacement of an object with respect to a reference point based on a first result of the first cross-correlation calculation and a second result of the second cross-correlation calculation;
 determining a position of the object based on the displacement with respect to the reference point;
 wherein the position sensor includes at least one of:
  a linear position sensor configured to sense a linear displacement of the object as the displacement, wherein the determining of the displacement of the object comprises:
   calculating a following first equation:

$$\frac{V_{a\_xcorr} - V_{b\_xcorr}}{V_{a\_xcorr} + V_{b\_xcorr}},$$

wherein $V_{a\_xcorr}$ and $V_{b\_xcorr}$ respectively correspond to the first and second results of the first and second cross-correlation calculations; and
  an angular position sensor configured to sense an angular displacement of the object as the displacement, wherein the determining of the displacement of the object comprises:

calculating a following second equation:

$a\tan 2(V_{sin\_xcorr}, V_{cos\_xcorr})$, wherein $V_{sin\_xcorr}$ and $V_{cos\_xcorr}$ respectively correspond to the first and second results of the first and second cross-correlation calculations.

14. The computer program product of claim 13, wherein the first sense signal, the second sense signal, and the excitation signal have substantially a same frequency one as another.

15. The computer program product of claim 13, wherein respective amplitudes of the first sense signal and the second sense signal are functions of the displacement of the object with respect to the reference point.

* * * * *